United States Patent
Kwon et al.

(10) Patent No.: US 12,438,172 B2
(45) Date of Patent: Oct. 7, 2025

(54) ENERGY-INDEPENDENT WATER ELECTROLYSIS FUEL CELL WATER CART

(71) Applicant: KWaterCraft Co., Ltd., Busan (KR)

(72) Inventors: Yujin Kwon, Busan (KR); Nam Ju Cho, Gyeongsangnam-do (KR); Myeong Seok Jeong, Busan (KR)

(73) Assignee: KWATERCRAFT CO., LTD, Busan (KR)

( * ) Notice: Subject to any disclaimer, the term of this patent is extended or adjusted under 35 U.S.C. 154(b) by 807 days.

(21) Appl. No.: 17/593,042

(22) PCT Filed: Jun. 5, 2019

(86) PCT No.: PCT/KR2019/006779
§ 371 (c)(1),
(2) Date: Sep. 7, 2021

(87) PCT Pub. No.: WO2020/179972
PCT Pub. Date: Sep. 10, 2020

(65) Prior Publication Data
US 2022/0190372 A1     Jun. 16, 2022

(30) Foreign Application Priority Data
Mar. 7, 2019   (KR) .................. 10-2019-0026211

(51) Int. Cl.
*H01M 8/0656*   (2016.01)
*B60L 50/75*   (2019.01)
(Continued)

(52) U.S. Cl.
CPC .......... *H01M 8/0656* (2013.01); *B60L 50/75* (2019.02); *B60L 58/40* (2019.02); *C25B 1/04* (2013.01);
(Continued)

(58) Field of Classification Search
CPC . H01M 8/0656; H01M 2250/20; B60L 50/75; B60L 2200/32; B60L 58/40; C25B 1/04
See application file for complete search history.

(56) References Cited

U.S. PATENT DOCUMENTS

| | | | |
|---|---|---|---|
| 6,508,866 B1 * | 1/2003 | Golben ................ | F17C 11/005 96/153 |
| 2005/0126924 A1 * | 6/2005 | Gomez .................... | C25B 1/04 205/637 |

(Continued)

FOREIGN PATENT DOCUMENTS

| | | | |
|---|---|---|---|
| JP | 2001035503 | * | 2/2001 |
| JP | 2001035503 A | * | 2/2001 |

(Continued)

OTHER PUBLICATIONS

English Machine Translation for JP 2001035503 (Year: 2001).*

(Continued)

*Primary Examiner* — Matthew T Martin
*Assistant Examiner* — Katherine N Higgins
(74) *Attorney, Agent, or Firm* — Boisbrun Hofman, PLLC

(57) ABSTRACT

An energy-independent water electrolysis fuel cell water cart system is disclosed. The energy-independent water electrolysis fuel cell water cart system presented in the present invention comprises: an awning for acquiring, through a solar panel, solar energy to be used as power necessary for an initial water electrolysis treatment and as reserve power, and blocking sunlight; a water electrolysis unit for performing water electrolysis treatment on supplied water by using the solar energy, and supplying hydrogen gas generated through the water electrolysis treatment to an energy generation unit after the hydrogen gas has undergone refinement and storage using an absorbent; the energy generation unit for generating electrical energy by means of a fuel cell scheme using the supplied hydrogen gas; and an (Continued)

energy storage unit for supplying the generated electrical energy as power for the energy-independent water electrolysis fuel cell water cart system.

1 Claim, 3 Drawing Sheets

(51) Int. Cl.
 *B60L 58/40* (2019.01)
 *C25B 1/04* (2021.01)
(52) U.S. Cl.
 CPC ...... *B60L 2200/32* (2013.01); *H01M 2250/20* (2013.01)

(56) References Cited

U.S. PATENT DOCUMENTS

| | | |
|---|---|---|
| 2008/0233440 A1 | 9/2008 | Kernene |
| 2012/0198884 A1* | 8/2012 | Golben ............... C10L 1/04 422/600 |

FOREIGN PATENT DOCUMENTS

| | | | | |
|---|---|---|---|---|
| JP | 2002017921 A | * | 1/2002 | |
| JP | 2004 162673 A | | 6/2004 | |
| JP | 2006068305 A | * | 3/2006 | |
| KR | 10 2005 0075628 B1 | | 7/2005 | |
| KR | 10 2017 0008401 A | | 1/2017 | |
| WO | WO-2016169744 A1 | * | 10/2016 | ............. C10B 53/02 |
| WO | 2020179972 A1 | | 9/2020 | |

OTHER PUBLICATIONS

English Machine Translation for JP 2006068305 A (Year: 2006).*
English Machine Translation for WO 2016169744 A1 (Year: 2016).*
English Machine Translation for JP-2001035503-A (Year: 2001).*
English Machine Translation for JP-2002017921-A (Year: 2002).*

* cited by examiner

ENERGY-INDEPENDENT WATER ELECTROLYSIS FUEL CELL WATER CART

TECHNICAL FIELD

The present disclosure relates to an energy-independent water electrolysis fuel cell water cart.

BACKGROUND ART

A water electrolysis system is a system which generates hydrogen and oxygen by electrochemically decomposing water, and has been in the spotlight as a hydrogen fabrication technology because the system has advantages in that it has a simple operation condition compared to other hydrogen fabrication methods and can obtain high-purity hydrogen having a small volume. In the water electrolysis field in which water is electrolyzed, representative methods include solid oxide electrolysis (SOE), polymer electrolyte membrane electrolysis (PEME), alkaline electrolysis (AE), etc.

In the water electrolysis field, a high temperature vapor electrolytic method is a method using a phenomenon in which electric energy necessary to decompose water is further reduced at a high temperature, and enables high efficiency water decomposition by using small electric energy and enables a directional operation because a structure and a principle are the same as those of a solid oxide cell (SOFC).

A fuel cell is a method of producing electricity by making hydrogen and oxygen electrochemically react with each other, and is one of alternative energy technologies because the fuel cell has less environmental pollution and high energy efficiency compared to an internal combustion engine. In particular, a water electrolysis treatment unit that produces hydrogen by electrolyzing water has been in the spotlight from an eco-environmental aspect in which only oxygen is discharged as byproducts along with hydrogen purity close to 100%.

A polymer electrolyte membrane fuel cell (PEMFC) continues to grow through a wide power supply range and various application fields. As guidelines for regarding the support of new renewable energy equipment are reformed in 2013, the energy yield and a modification factor 6.5 were designated, and the PEMFC is rapidly introduced up to the civilian market in addition to a mandatory market for public institution installation.

Among application fields of the fuel cell, a transport field is focused on the vehicle market. DOOSAN Pure Cell merges with Clear Edge Power and focuses on the production of fuel cells which may be supplied to buildings sand vehicles. Hyundai Motor Company plans to produce hydrogen electric vehicles from January in 2018.

Korea Institute of Energy Research developed a parallel plate high temperature water electrolysis hydrogen fabrication technology which may reuse high-temperature and high-pressure waste heat and water vapor. Ulsan National Institute of Science and Technology (UNIST) developed a solid oxide water electrolysis cell for producing hydrogen of 0.9 L at a time by applying, as perovskite, a dual layer of anode (positive pole) and cathode (negative pole) materials.

Korean Patent Application Publication No. 10-2005-0075628 relates to a high-temperature methane modified hybrid water electrolysis treatment unit, and discloses a technology for efficiently using heat as energy and reducing energy consumption, compared to the existing water electrolysis treatment unit, by simultaneously producing hydrogen according to a water vapor modified reaction of methane and hydrogen according to a high-temperature water electrolysis reaction and using heat generated by a self-heating reaction of methane and heat generated by a full oxidation reaction or partial oxidation reaction of methane in a water electrolysis device that requires a high temperature operation condition.

DISCLOSURE

Technical Problem

An object of the present disclosure is to provide an energy-independent water electrolysis fuel cell water cart capable of nationally reducing the use of chemical fuel, using an alternative eco-environmental energy, and producing and using energy by eco-environmentally producing hydrogen through water which can be easily obtained anywhere in order to reduce greenhouse gas emission for handling a climate change and to perform obligation for the adaptation of a climate change.

Technical Solution

In an aspect, an energy-independent water electrolysis fuel cell water cart system proposed by the present disclosure includes an awning obtaining power necessary for initial water electrolysis treatment and sunlight energy to be used as reserve power through a solar panel and blocking sunlight, a water electrolysis unit performing water electrolysis treatment on supplied water by using the sunlight energy and supplying hydrogen gas, generated through the water electrolysis treatment, to an energy generation unit through refinement using an absorbent and storage, an energy generation unit generating electricity energy by using a fuel cell method using the supplied hydrogen gas, and an energy storage unit supplying the generated electricity energy as electric power for the energy-independent water electrolysis fuel cell water cart system.

The water electrolysis unit includes a water electrolysis treatment unit generating clean hydrogen gas through hydrogen electrolysis using sunlight energy by using filtered and refined water, a gas controller adjusting pressure of the hydrogen gas generated through the water electrolysis treatment and supplying the hydrogen gas, a hydrogen refinement unit converting the generated hydrogen into high-purity clean hydrogen gas through a hydrogen refinement process using an absorbent, and a hydrogen storage unit storing the refined hydrogen gas.

The energy storage unit comprises a best management system (BMS) and an energy storage system (ESS) and stores extra electricity in a battery so that driving is possible even without power supply without requiring separate energy charging.

In another aspect, a method of supply power in an energy-independent water electrolysis fuel cell water cart system, which is proposed by the present disclosure, includes obtaining power necessary for initial water electrolysis treatment and sunlight energy to be used as reserve power through a solar panel of an awning for blocking sunlight, performing water electrolysis treatment on supplied water by using the sunlight energy and supplying hydrogen gas, generated through the water electrolysis treatment, to an energy generation unit through refinement using an absorbent and storage, generating electricity energy by using a fuel cell method using the supplied hydrogen gas, and supplying the generated electricity energy as electric power for the energy-independent water electrolysis fuel cell water cart system.

Performing water electrolysis treatment on supplied water by using the sunlight energy and supplying hydrogen gas, generated through the water electrolysis treatment, to an energy generation unit through refinement using an absorbent and storage includes generating clean hydrogen gas through hydrogen electrolysis using sunlight energy by using filtered and refined water, adjusting pressure of the generated hydrogen gas and supplying the hydrogen gas, converting the generated hydrogen into high-purity clean hydrogen gas through a hydrogen refinement process using an absorbent, and storing the refined hydrogen gas.

supplying the generated electricity energy as electric power for the energy-independent water electrolysis fuel cell water cart system includes storing extra electricity in a battery so that driving is possible even without power supply without requiring separate energy charging by using an energy storage unit comprising a best management system (BMS) and an energy storage system (ESS).

Advantageous Effects

According to embodiments of the present disclosure, there can be provided the energy-independent water electrolysis fuel cell water cart, which can reduce the use of chemical fuel, can use an alternative eco-environmental energy, and can produce and use energy by eco-environmentally producing hydrogen through water which can be easily obtained anywhere.

MODE FOR INVENTION

Hereinafter, embodiments of the present disclosure are described in detail with reference to the accompanying drawings.

Figure 1:
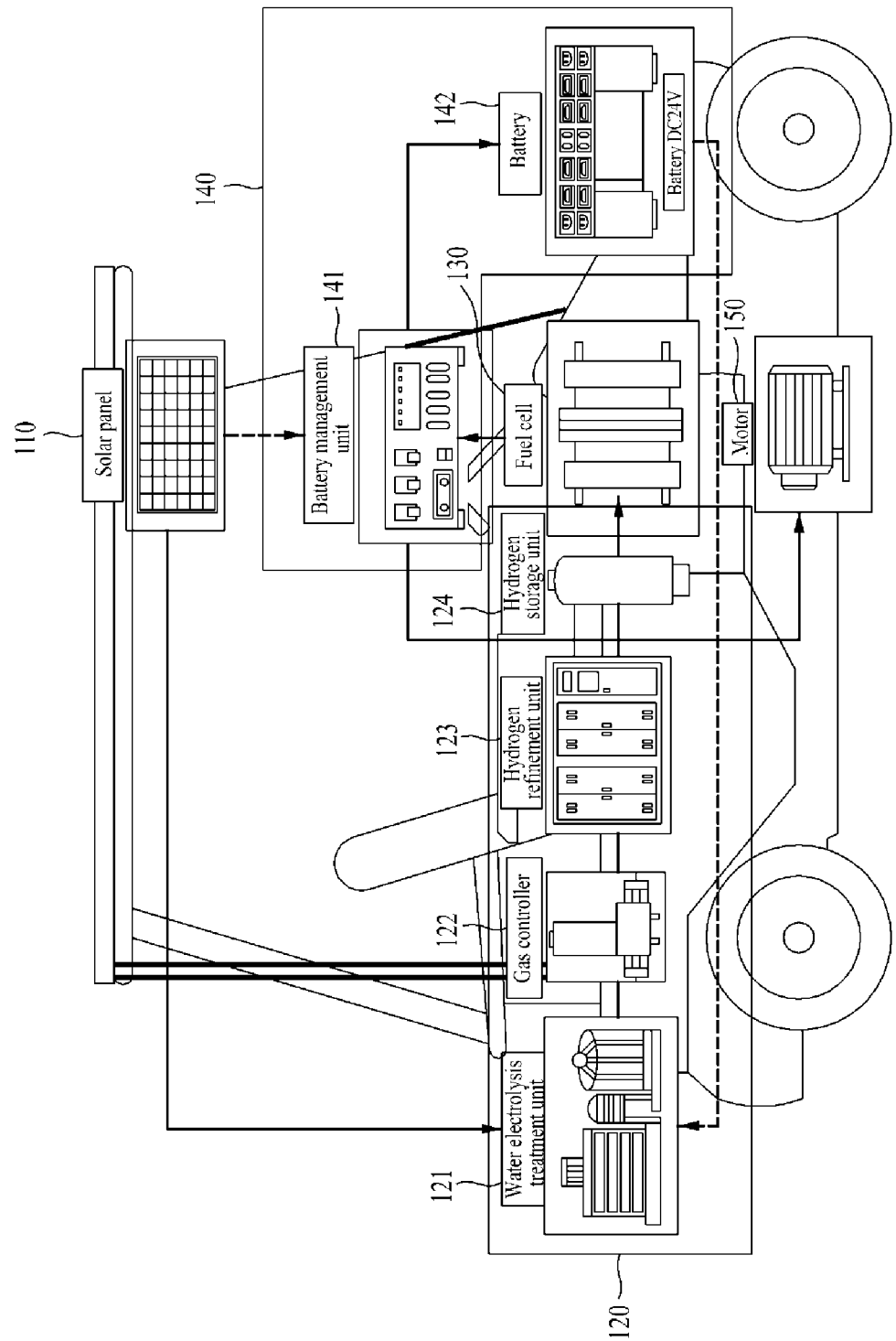
FIG. 1 is a diagram illustrating a schematic diagram of an energy-independent water electrolysis fuel cell water cart system according to an embodiment of the present disclosure.

FIG. 1 is a diagram illustrating a schematic diagram of an energy-independent water electrolysis fuel cell water cart system according to an embodiment of the present disclosure.

A fuel cell has been in the spotlight as an interest in eco-environmental an alternative energy is growing due to the exhaustion of fossil energy and global warming. The fuel cell is a cell which converts, into electric energy, chemical energy generated when fuel is oxidized. The fuel cell is different from a common chemical cell in that it continues to be supplied with fuel from the outside and generates electricity by oxidizing the fuel. An energy source of the fuel cell uses hydrogen as main fuel, and has advantages of high energy density and a small change in time and load. The present disclosure relates to an energy independent type fuel cell water cart using, as an energy source, water using such a fuel cell.

A proposed energy-independent water electrolysis fuel cell water cart system includes an awning including a solar panel 110, a water electrolysis unit 120, an energy generation unit (in other words, a fuel cell) 130 and an energy storage unit 140.

The awning obtains power necessary for initial water electrolysis treatment and sunlight energy to be used as reserve power through the solar panel 110, and blocks sunlight.

The water electrolysis unit 120 performs water electrolysis treatment on supplied water by using the sunlight energy, and supplies hydrogen gas, generated through the water electrolysis treatment, to the energy generation unit through refinement using an absorbent and storage. The water electrolysis unit 120 includes a water electrolysis treatment unit 121, a gas controller 122, a hydrogen refinement unit 123 and a hydrogen storage unit 124.

The water electrolysis treatment unit 121 is supplied with filtered and refined water, and generates clean hydrogen gas through hydrogen electrolysis using sunlight energy.

The gas controller 122 adjusts pressure of the hydrogen gas generated the water electrolysis treatment, and supplies the hydrogen gas.

The hydrogen refinement unit 123 converts the generated hydrogen into high-purity clean hydrogen gas through a hydrogen refinement process using an absorbent.

The hydrogen storage unit 124 stores the refined hydrogen gas.

The energy generation unit (in other words, the fuel cell) 130 generates electricity energy by using a fuel cell method using the supplied hydrogen gas. The energy generation unit 130 generates electricity by making the hydrogen gas, generated through the water electrolysis treatment and converted into the high-purity clean hydrogen gas through the hydrogen refinement process, and oxygen electrochemically react with each other by using the fuel cell 130.

The energy storage unit 140 includes a battery management unit 141 and a battery 142. The battery management unit 141 supplies the generated electricity energy as electric power for the energy-independent water electrolysis fuel cell water cart system. Such an energy storage unit 140 includes a best management system (BMS) and an energy storage system (ESS). Furthermore, extra electricity is stored in the battery 142 so that driving is possible even without the supply of power without requiring separate energy charging.

A motor 150 may drive the water cart illustrated in FIG. 1 by using electric power supplied by the energy storage unit 140.

Figure 2:
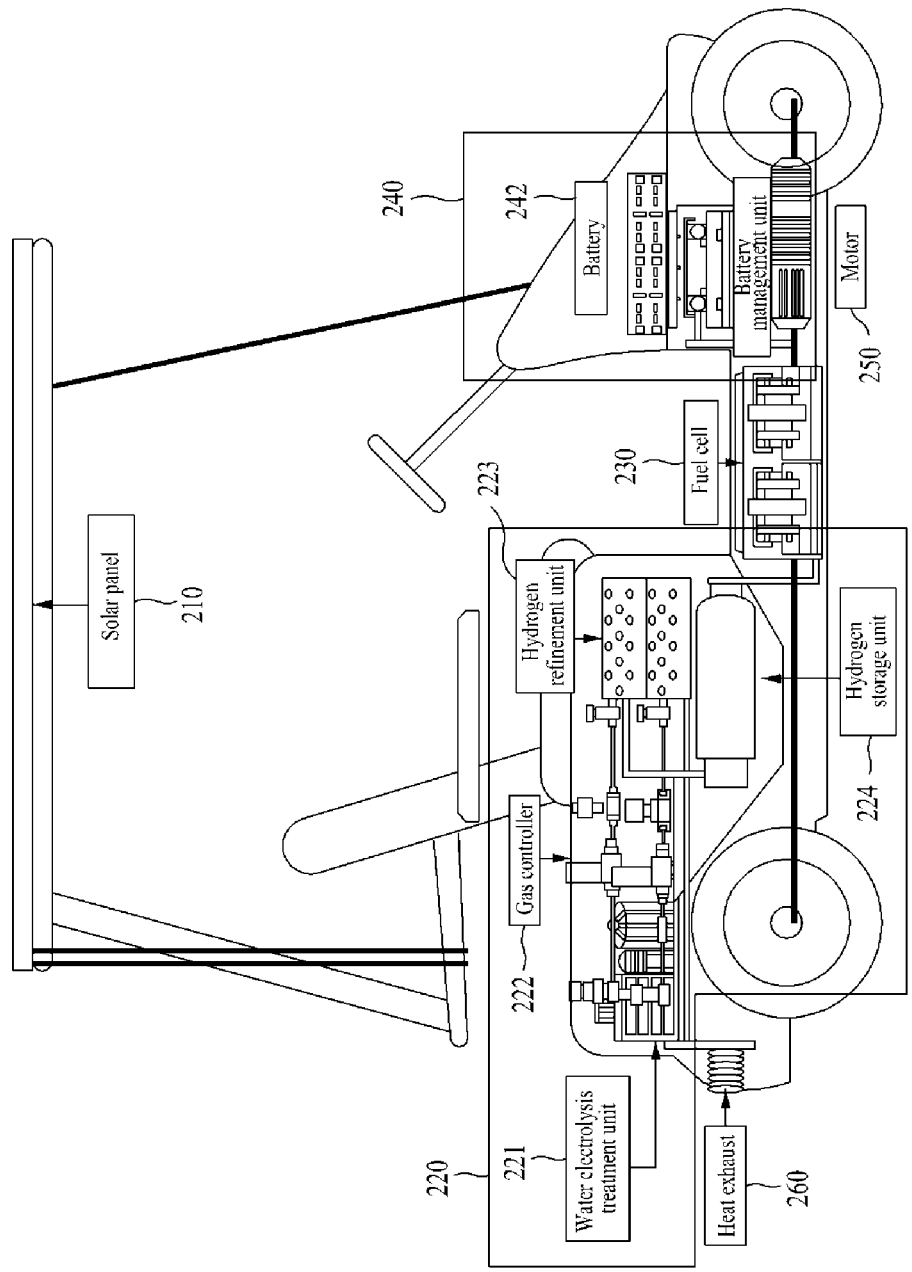
FIG. 2 is a diagram illustrating an aerial view of an energy-independent water electrolysis fuel cell water cart system according to an embodiment of the present disclosure.

FIG. 2 is a diagram illustrating an aerial view of an energy-independent water electrolysis fuel cell water cart system according to an embodiment of the present disclosure.

As described above, the proposed energy-independent water electrolysis fuel cell water cart system includes an awning including a solar panel 210, a water electrolysis unit 220, a fuel cell 230 and an energy storage unit 240.

The awning obtains power necessary for initial water electrolysis treatment and sunlight energy to be used as reserve power through the solar panel 210, and blocks sunlight. The solar panel supplies power necessary for initial water electrolysis treatment by using the sunlight energy, and uses the power as reserve power.

The water electrolysis unit 220 performs water electrolysis treatment on supplied water by using the sunlight energy, and supplies hydrogen gas, generated through the water electrolysis treatment, to the energy generation unit through refinement using an absorbent and storage. The water electrolysis unit 220 includes a water electrolysis treatment unit 221, a gas controller 222, a hydrogen refinement unit 223 and a hydrogen storage unit 224. The water electrolysis treatment unit 221 is supplied with filtered and refined water, and generates clean hydrogen gas through hydrogen electrolysis using sunlight energy. The gas controller 222 adjusts pressure of the hydrogen gas generated the water electrolysis treatment, and supplies the hydrogen gas. The hydrogen refinement unit 223 converts the generated hydrogen into high-purity clean hydrogen gas through a hydrogen refinement process using an absorbent. The hydrogen storage unit 224 stores the refined hydrogen gas.

The fuel cell 230 generates electricity energy by using a fuel cell method using the supplied hydrogen gas, and may have a stacked form as in FIG. 2. The fuel cell 230 generates electricity by making the hydrogen gas, generated through the water electrolysis treatment and converted into the high-purity clean hydrogen gas through the hydrogen refinement process, and oxygen electrochemically react with each other by using the fuel cell 230.

The energy storage unit 240 includes a battery management unit 241 and a battery 242. The battery management unit 241 supplies the generated electricity energy as electric power for the energy-independent water electrolysis fuel cell water cart system. Such an energy storage unit 240 includes a best management system (BMS) and an energy storage system (ESS). Furthermore, extra electricity is stored in the battery 242 so that driving is possible even without the supply of power without requiring separate energy charging. A motor 250 may drive the water cart illustrated in FIG. 2 by using electric power supplied by the energy storage unit 240. Hear generated while the cart is driven may be discharged through a heat exhaust 260.

Figure 3:
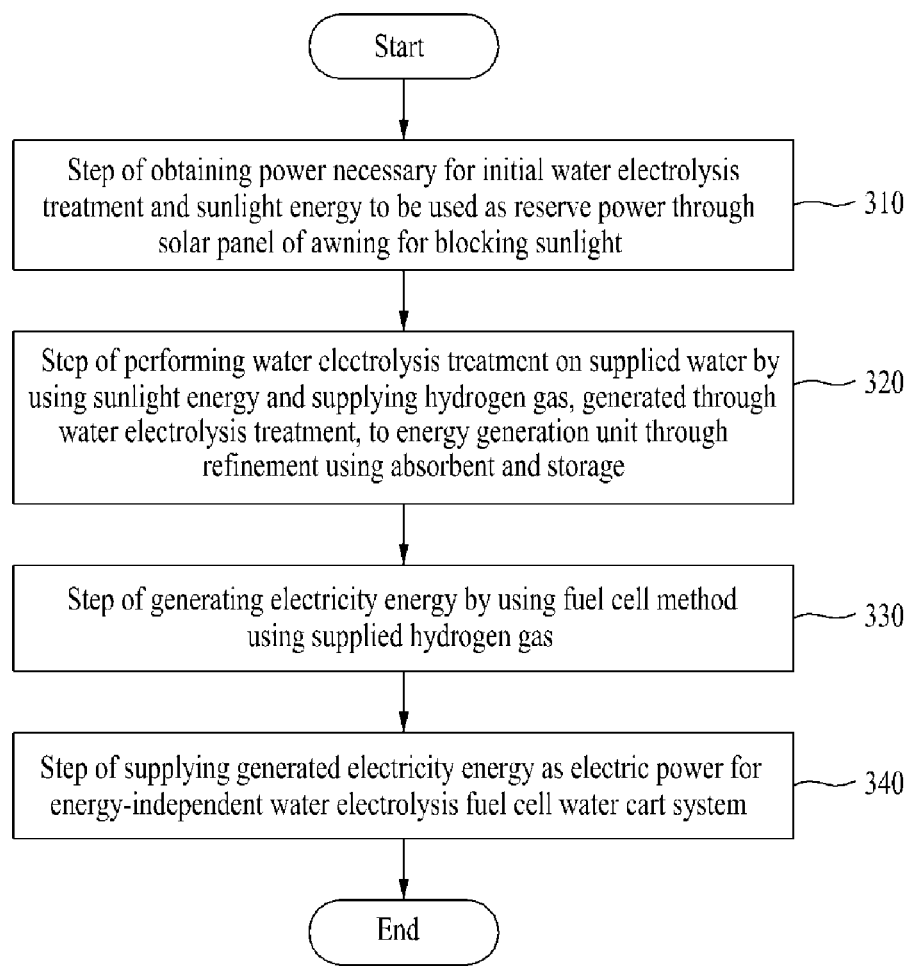
FIG. 3 is a flowchart for describing a method of supply power in the energy-independent water electrolysis fuel cell water cart system according to an embodiment of the present disclosure.

FIG. 3 is a flowchart for describing a method of supply power in the energy-independent water electrolysis fuel cell water cart system according to an embodiment of the present disclosure.

The proposed method of supply power in the energy-independent water electrolysis fuel cell water cart system includes step 310 of obtaining power necessary for initial water electrolysis treatment and sunlight energy to be used as reserve power through the solar panel of the awning for blocking sunlight, step 320 of performing water electrolysis treatment on supplied water by using the sunlight energy and supplying hydrogen gas, generated through the water electrolysis treatment, to the energy generation unit through refinement using an absorbent and storage, step 330 of generating electricity energy by using a fuel cell method using the supplied hydrogen gas, and step 340 of supplying the generated electricity energy as electric power for the energy-independent water electrolysis fuel cell water cart system.

In step 310, power necessary for initial water electrolysis treatment and sunlight energy to be used as reserve power are obtained through the solar panel of the awning for blocking sunlight.

In step 320, water electrolysis treatment is performed on supplied water by using the sunlight energy. Hydrogen gas generated through the water electrolysis treatment is supplied to the energy generation unit through refinement using an absorbent and storage. The water electrolysis treatment unit is supplied with filtered and refined water, and generates clean hydrogen gas through hydrogen electrolysis using sunlight energy. The gas controller adjusts pressure of the hydrogen gas generated the water electrolysis treatment, and supplies the hydrogen gas. The hydrogen refinement unit converts the generated hydrogen into high-purity clean hydrogen gas through a hydrogen refinement process using an absorbent. The hydrogen storage unit stores the refined hydrogen gas.

In step 330, electricity energy is generated by using a fuel cell method using the supplied hydrogen gas. The energy generation unit generates electricity by making the hydrogen gas, generated through the water electrolysis treatment and converted into the high-purity clean hydrogen gas through the hydrogen refinement process, and oxygen electrochemically react with each other by using the fuel cell.

In step 340, the generated electricity energy is supplied as electric power for the energy-independent water electrolysis fuel cell water cart system. The battery management unit of the energy storage unit supplies the generated electricity energy as electric power for the energy-independent water electrolysis fuel cell water cart system. Such an energy storage unit includes a best management system (BMS) and an energy storage system (ESS). Extra electricity is stored in the battery so that driving is possible even without the supply of power without requiring separate energy charging.

The aforementioned device may be implemented by a hardware component, a software component and/or a combination of a hardware component and a software component. For example, the device and component described in the embodiments may be implemented using a processor, a controller, an arithmetic logic unit (ALU), a digital signal processor, a microcomputer, a field programmable gate array (FPGA), a programmable logic unit (PLU), a microprocessor or one or more general-purpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, a computer storage medium or a device in order to be interpreted by the processor or to provide an instruction or data to the processing device. The software may be distributed to computer systems connected over a network and may be stored or executed in a distributed manner. The software and the data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure alone or in combination. The program instruction stored in the medium may be specially designed and constructed for an embodiment, or may be known and available to those skilled in the computer software field. Examples of the computer-readable medium include magnetic media such as a hard disk, a floppy disk and a magnetic tape, optical media such as a CD-ROM and a DVD, magneto-optical media such as a floptical disk, and hardware devices specially configured to store and execute a program instruction, such as a ROM, a RAM, and a flash memory. Examples of the program instruction include not only machine language code produced by a compiler, but a high-level language code which may be executed by a computer using an interpreter, etc.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as the system, configuration, device, and circuit, are coupled or combined in a form different from that of the described method or replaced or substituted with other components or equivalents.

Accordingly, other implementations, other embodiments, and the equivalents of the claims fall within the scope of the claims.

The invention claimed is:

1. An energy-independent water electrolysis fuel cell water cart system, comprising:
   a front part where a steering wheel and front wheels are disposed;
   a rear part where a seat and rear wheels are disposed;
   a connection part connecting between the front part and the rear part;
   an awning roof obtaining power necessary for initial water electrolysis treatment and sunlight energy to be used as reserve power through a solar panel disposed on the awning roof and blocking sunlight, wherein the awning roof is connected to the seat;
   a water electrolysis unit performing water electrolysis treatment on supplied water by using the sunlight energy and supplying hydrogen gas, generated through the water electrolysis treatment, to an energy generation unit through refinement using an absorbent and storage, wherein the water electrolysis unit comprises:
      a water electrolysis treatment unit generating clean hydrogen gas through hydrogen electrolysis using sunlight energy by using filtered and refined water;
      a gas controller adjusting pressure of the hydrogen gas generated through the water electrolysis treatment and supplying the hydrogen gas;
      a hydrogen refinement unit converting the generated hydrogen into high-purity clean hydrogen gas through a hydrogen refinement process using an absorbent; and
      a hydrogen storage unit storing the refined hydrogen gas;
   an energy generation unit including a fuel cell generating electricity energy by the fuel cell using the supplied hydrogen gas; and
   an energy storage unit supplying the generated electricity energy as electric power for the energy-independent water electrolysis fuel cell water cart system, wherein the energy storage unit comprises a battery management system (BMS) and a battery and stores extra electricity in the battery so that driving is possible even without power supply without requiring separate energy charging;
   wherein:
      the awning roof is connected to the seat;
      the water electrolysis treatment unit, the gas controller, the hydrogen refinement unit, and the hydrogen storage unit are disposed in the rear part under the seat;
      the BMS and the battery are disposed in the front part;
      the fuel cell is disposed in the connection part between the seat and the front part;
      the energy-independent water electrolysis fuel cell water cart system is an open-sided cart; and
      the open-sided cart operates energy-independently, without external power being supplied to the open sided cart, by:
         using electric power from at least a portion of the sunlight energy obtained by the solar panel for initial operation of the water electrolysis treatment of the water electrolysis treatment unit; and
         storing electric power from the remaining sunlight energy obtained by the solar panel and the remaining electric power generated by the fuel cell to the battery.

* * * * *